US009618238B2

(12) United States Patent
Akisawa et al.

(10) Patent No.: US 9,618,238 B2
(45) Date of Patent: Apr. 11, 2017

(54) ADSORPTION REFRIGERATOR

(71) Applicant: National University Corporation Tokyo University of Agriculture and Technology, Fuchu-shi (JP)

(72) Inventors: Atsushi Akisawa, Fuchu (JP); Mizanur Rahman, Fuchu (JP)

(73) Assignee: NATIONAL UNIVERSITY CORPORATION TOKYO UNIVERSITY OF AGRICULTURE AND TECHNOLOGY, Fuchu-shi (JP)

( * ) Notice: Subject to any disclaimer, the term of this patent is extended or adjusted under 35 U.S.C. 154(b) by 289 days.

(21) Appl. No.: 14/410,258

(22) PCT Filed: Jun. 25, 2013

(86) PCT No.: PCT/JP2013/067404
§ 371 (c)(1),
(2) Date: Dec. 22, 2014

(87) PCT Pub. No.: WO2014/003013
PCT Pub. Date: Jan. 3, 2014

(65) Prior Publication Data
US 2015/0159923 A1    Jun. 11, 2015

(30) Foreign Application Priority Data

Jun. 26, 2012  (JP) ................................ 2012-143509

(51) Int. Cl.
*F25B 17/00*  (2006.01)
*F25B 17/02*  (2006.01)
(Continued)

(52) U.S. Cl.
CPC .............. *F25B 17/00* (2013.01); *F25B 17/08* (2013.01); *F25B 30/04* (2013.01); *F25B 49/046* (2013.01); *Y02B 30/62* (2013.01); *Y02B 30/64* (2013.01)

(58) Field of Classification Search
CPC ........ F25B 17/08; F25B 30/04; F25B 49/046; F25B 17/00; F25B 17/083; F25B 17/086; F25B 29/006; Y02B 30/64
(Continued)

(56) References Cited

U.S. PATENT DOCUMENTS 4,439,994 A * 4/1984 Briley .................... C09K 5/047
62/101
6,314,744 B1 * 11/2001 Ogawa .................... F25B 25/02
62/106
(Continued)

FOREIGN PATENT DOCUMENTS

| JP | 5 248727 | 9/1993 |
| JP | 6 180159 | 6/1994 |
| JP | 2010 526983 | 8/2010 |

OTHER PUBLICATIONS

International Search Report Issued Oct. 1, 2013 in PCT/JP13/067404 Filed Jun. 25, 2013.

*Primary Examiner* — Ryan J Walters
*Assistant Examiner* — Joseph Trpisovsky
(74) *Attorney, Agent, or Firm* — Oblon, McClelland, Maier & Neustadt, L.L.P.

(57) ABSTRACT

Provided is an adsorption refrigerator that achieves high cooling capacity while reducing the volume the device as a whole occupies. The adsorption refrigerator according to the present embodiment has a configuration in which only one adsorption reactor is positioned directly above a first lower-layer adsorption reactor and a second lower-layer adsorption reactor. In addition, the adsorption refrigerator according to
(Continued)

the present embodiment performs sequence control in which one of the first lower-layer adsorption reactor and the second lower-layer adsorption reactor keeps performing an adsorption process, whereas the other one changes processes of preheating, desorption, precooling, and adsorption.

3 Claims, 11 Drawing Sheets

(51) Int. Cl.
*F25B 15/00* (2006.01)
*F25B 17/08* (2006.01)
*F25B 49/04* (2006.01)
*F25B 30/04* (2006.01)

(58) Field of Classification Search
USPC ......... 62/477, 478, 103, 106, 141, 143, 144, 62/481, 485
See application file for complete search history.

(56) References Cited

U.S. PATENT DOCUMENTS

2006/0130652 A1* 6/2006 Takewaki ............... B01D 53/28
95/148
2010/0300124 A1 12/2010 Braunschweig et al.
2011/0265509 A1* 11/2011 Smeding ............... F16K 11/074
62/478

* cited by examiner

FIG. 5

(a) FOURTH OPEN/CLOSE VALVE: OPEN | CLOSE | OPEN | CLOSE | OPEN (b) FIRST LOWER-LAYER ADSORPTION REACTOR: ADSORPTION | PREHEATING | DESORPTION | PRECOOLING | ADSORPTION | PREHEATING | DESORPTION | PRECOOLING | ADSO...

(c) SECOND OPEN/CLOSE VALVE: CLOSE | OPEN | CLOSE | OPEN | CLOSE (d) FIFTH OPEN/CLOSE VALVE: CLOSE | OPEN | CLOSE | OPEN | C...

(e) SECOND LOWER-LAYER ADSORPTION REACTOR: PRECOOLING | ADSORPTION | PREHEATING | DESORPTION | PRECOOLING | ADSORPTION | PREHEATING | DESORPTION (f) THIRD OPEN/CLOSE VALVE: CLOSE | OPEN | CLOSE | OPEN | CLOSE (g) UPPER-LAYER ADSORPTION REACTOR: PREHEATING | DESORPTION | PRECOOLING | ADSORPTION | PREHEATING | DESORPTION | PRECOOLING | ADSORPTION | PREHEATING | DESORPTION | PRECOOLING (h) FIRST OPEN/CLOSE VALVE: CLOSE | OPEN | CLOSE | OPEN | CLOSE | OPEN t1 t2 t3 t4 t5 t6 t7 t8

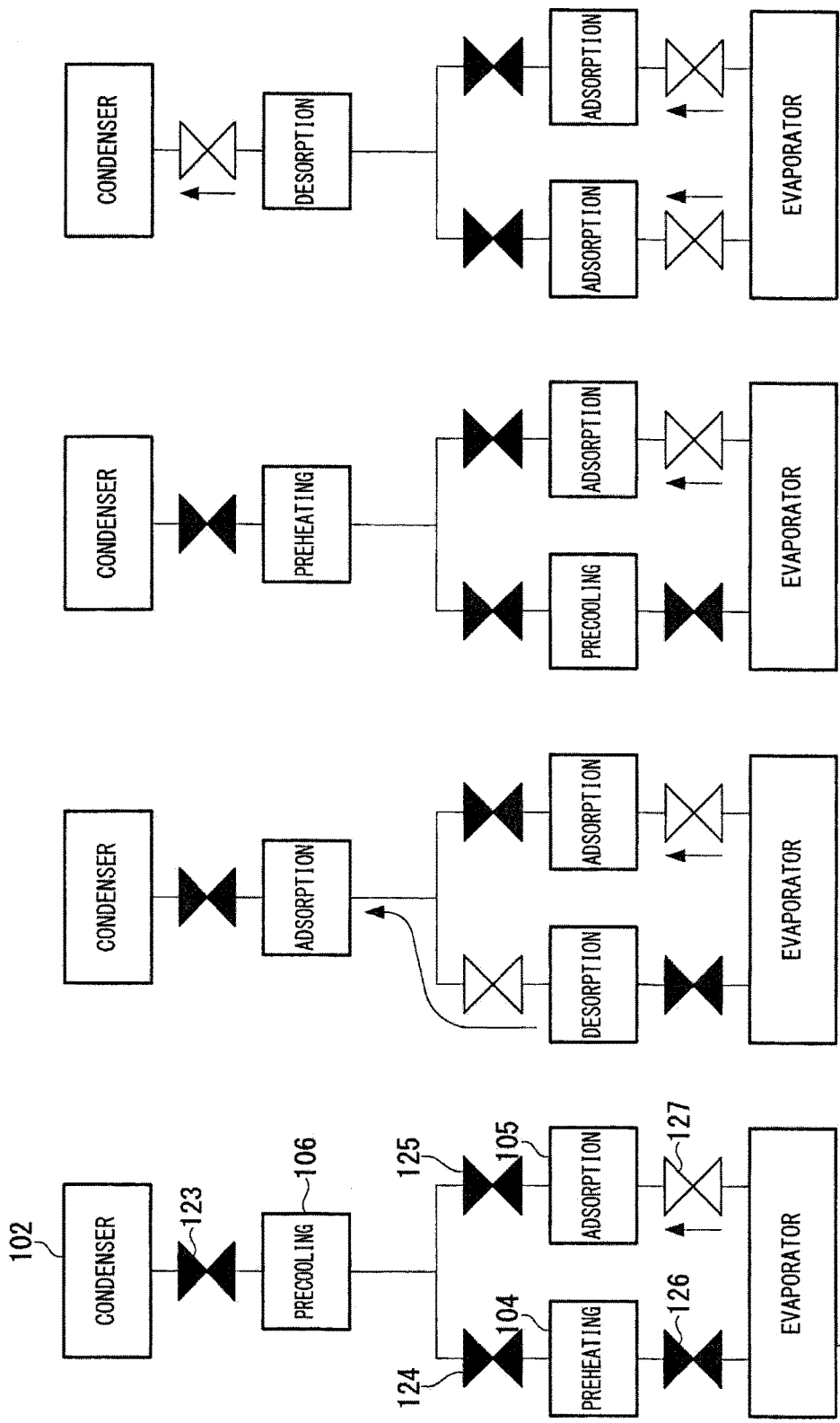

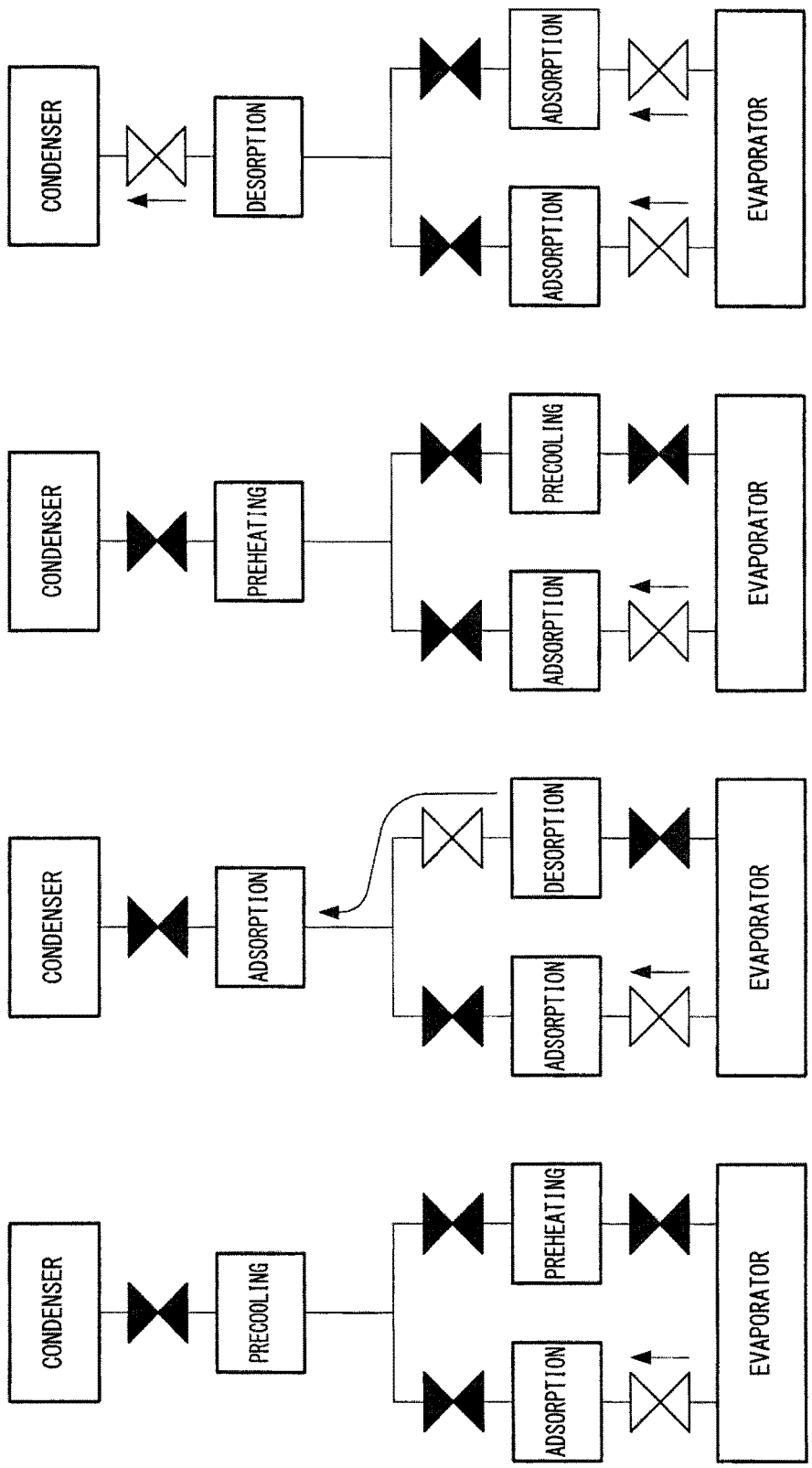

FIG. 10

(a) FIRST LOWER-LAYER ADSORPTION REACTOR

| ADSORPTION | PREHEATING | DESORPTION | PRECOOLING | ADSORPTION | PREHEATING | DESORPTION | ADSORPTION |

(b) SECOND LOWER-LAYER ADSORPTION REACTOR

| PRECOOLING | ADSORPTION | PREHEATING | DESORPTION | PRECOOLING | ADSORPTION | PREHEATING | DESORPTION |

(c) INTERMEDIATE-LAYER ADSORPTION REACTOR

| PREHEATING | DESORPTION | PRECOOLING | ADSORPTION | PREHEATING | DESORPTION | PRECOOLING | ADSORPTION | PREHEATING | DESORPTION | PRECOOLING | ADSOR |

(d) FIRST OPEN/CLOSE VALVE

| CLOSE | OPEN | CLOSE | OPEN | CLOSE | OPEN | CLOSE | OPEN | CLOS |

(e) UPPER-LAYER ADSORPTION REACTOR

| PRECOOLING | ADSORPTION | PREHEATING | DESORPTION | PRECOOLING | ADSORPTION | PREHEATING | DESORPTION | PRECOOLING | ADSORPTION | PREHEATING | DE |

(f) SIXTH OPEN/CLOSE VALVE

| CLOSE | OPEN | CLOSE | OPEN | CLOSE | OPEN | CLOSE |

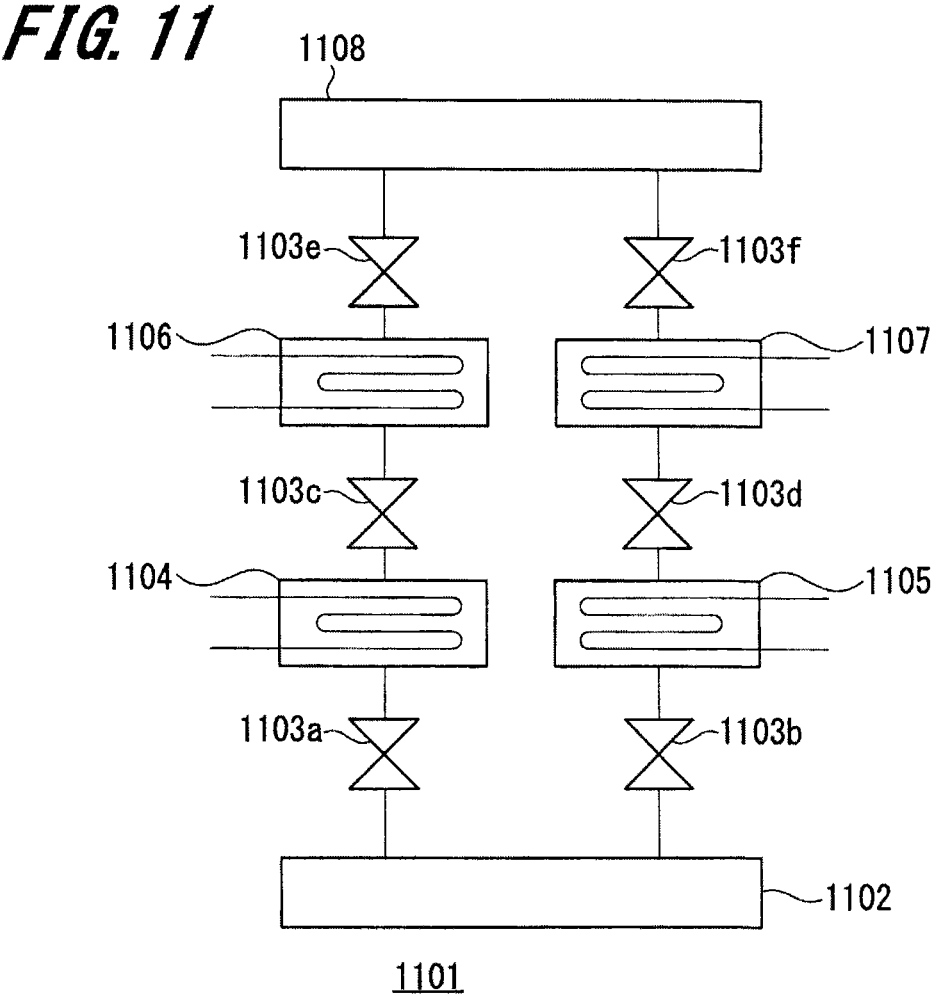

ADSORPTION REFRIGERATOR

TECHNICAL FIELD

The present invention relates to an adsorption refrigerator.

BACKGROUND ART

In recent years, adsorption refrigerators have been receiving attention in response to an increase in public demands for energy conservation, environmental protection, and the like. Main constituent elements of an adsorption refrigerator include a pair of adsorption reactors, a condenser, and an evaporator. Note that the adsorption reactor is also called an adsorption heat exchanger. Furthermore, the adsorption refrigerator has a vacuum pump for creating a vacuum in the adsorption reactor, the condenser, and the evaporator.

The condenser is provided above the pair of adsorption reactors arranged at the right and left. The evaporator is provided below the adsorption reactors. Furthermore, the adsorption reactor is provided with a first water circuit for circulating hot water or cooling water. The condenser and the evaporator are each provided with a second water circuit for circulating a refrigerant. The evaporator is provided with a third water circuit for circulating chilled water that cools a cooling target. The condenser is provided with a fourth water circuit for circulating cooling water.

In addition, the pair of adsorption reactors is provided with a switching valve for alternately circulating hot water and cooling water. Furthermore, the pair of adsorption reactors, the condenser, and the evaporator are each provided with an open/close valve, and the open/close valve allows a refrigerant vapor obtained by vaporizing a refrigerant, to pass through. Then, the adsorption refrigerator includes a control device that controls the vacuum pump and the open/close valve.

The adsorption reactor has an adsorbent such as silica gel or zeolite, which adsorbs and desorbs the refrigerant vapor, filled therein.

The space formed by the adsorption reactor, the condenser, and the evaporator is put into a reduced pressure with the vacuum pump. After that, the refrigerant vapor is obtained by the vaporization of the refrigerant through the use of the evaporator. At this time, heat is taken away from chilled water since the refrigerant is evaporated by vaporization, and thus the chilled water is cooled by the refrigerant. Then, the refrigerant vapor is adsorbed by the adsorbent in the adsorption reactor. The adsorbed refrigerant vapor is desorbed from the adsorbent by heating the adsorbent with hot water. The refrigerant vapor desorbed from the adsorbent is condensed into the refrigerant again with the cooling water through the condenser. The condensed refrigerant is transmitted to the evaporator through a pipe, and becomes vapor by vaporization again.

With the adsorption refrigerator described above, it is possible to generate chilled water with a temperature of approximately 9° C. by providing hot water with a temperature of approximately 80° C. and cooling water with a temperature of approximately 30° C. while maintaining the inside of the adsorption reactor, the condenser, and the evaporator under the reduced pressure. The temperature of 9° C. is cool enough to be capable of being sufficiently used for air conditioning.

The adsorption refrigerator is advantageous in that: the refrigerator consumes remarkably less electric power than an equivalent size of a general-type vapor-compression refrigerator employing a refrigerant such as alternative chlorofluorocarbon: natural working medium such as water can be used as the refrigerant; and hot water with a relatively low temperature can be effectively used. Namely, the adsorption refrigerator significantly reduces environmental load, provides enhanced safety, consumes less electric power, and exhibits high versatility.

In particular, hot water or cooling water to be used in the first water circuit does not come into contact with the adsorbent, the refrigerant and chilled water, and thus any material can be used as long as even a predetermined condition such as chemical stability is satisfied. In an extreme case, it is possible to use even seawater. Furthermore, the adsorption refrigerator can sufficiently use even low-temperature hot water which cannot be used in order to generate electric power in ordinary circumstances and which is difficult to be used in various types of industrial applications. The adsorption refrigerator can sufficiently use not only, for example, hot water utilizing exhaust heat obtained from factories but also hot water with a relatively low temperature such as hot water, obtained from waste incineration facilities or the like.

On the other hand, the only disadvantage is that the size of the adsorption refrigerator unavoidably increases in order to achieve high cooling performance. However, due to the advantages described above, which outweigh the disadvantage, the adsorption refrigerator has been significantly receiving attention in recent years.

In order to further improve the performance of the adsorption refrigerator as described above, a large number of engineers have been developing various techniques. One of the techniques includes a technique of making adsorption reactors into multiple stages.

In order to desorb the refrigerant vapor adsorbed by the adsorbent, hot water is necessary. The higher the temperature of the hot water is, in the shorter time the refrigerant vapor can be separated. For this reason, in the prior art, the adsorption refrigerator uses hot water with approximately 80° C. However, depending on locations or facilities where the adsorption refrigerator is installed, there may be cases where only hot water having a temperature that does not reach 80° C. is obtained. Namely, the lower the temperature of hot water that can be used is, the larger the application range of the adsorption refrigerator becomes. However, in the case where hot water utilized has a temperature lower than that of the prior art, the desorption capability of the adsorbent is lowered. Therefore, the amount of refrigerant vapor that the adsorption reactor adsorbs and desorbs becomes smaller than that in the prior art, and thus sufficient cooling effects cannot be obtained.

For these reasons, adsorption reactors are made into multi stages in order to ensure the amount of refrigerant vapor adsorbed and desorbed in the adsorption reactors so as to be equivalent to that in the conventional device even if hot water used has a low temperature. Namely, two stages or three stages of multi-staged adsorption reactors are provided between the condenser and the evaporator, and the refrigerant is caused to pass through the two stages or the three stages of the adsorption reactors. With the configuration, the reduction in the performance of the adsorption reactors in terms of adsorption of the refrigerant vapor, which takes place due to the use of the low-temperature hot water, can be compensated for. By making the adsorption reactor of the adsorption refrigerator into multiple stages as described above, it is possible to realize the adsorption refrigerator having a practical cooling capability even by using hot water of approximately 60° C.

Patent Literature 1 discloses details of technique of an adsorption refrigerator provided with two stages of adsorption reactors.

CITATION LIST

Patent Literature

PTL 1: Japanese Patent Laid-Open Publication No. 05-248727

SUMMARY OF INVENTION

Technical Problem

FIG. 11 is a schematic view illustrating an adsorption refrigerator provided with two stages (two layers) of adsorption reactors in accordance with prior art.

An adsorption refrigerator 1101 includes a first lower-layer adsorption reactor 1104 and a second lower-layer adsorption reactor 1105 provided above an evaporator 1102, via open/close valves 1103a and 1103b.

A first upper-layer adsorption reactor 1106 is provided above the first lower-layer adsorption reactor 1104, via an open/close valve 1103c.

A second upper-layer adsorption reactor 1107 is provided above the second lower-layer adsorption reactor 1105, via an open/close valve 1103d.

A condenser 1108 is provided above the first upper-layer adsorption reactor 1106 and the second upper-layer adsorption reactor 1107, via open/close valves 1103e and 1103f.

As can be seen from FIG. 11, with the conventional multi-staged adsorption refrigerator as described in Patent Literature 1, the number of adsorption reactors is increased two by two depending on the number of stages. The number of adsorption reactors is four in the case of two stages, and is six in the case of three stages. The volume of the adsorption reactor is large, and thus multi-staging of adsorption reactors increases the entire volume of the adsorption refrigerator in proportion to the number of stages. Therefore, a problem of occupying largely the space used for installing the adsorption refrigerator arises.

An object of the present invention is to solve the problem described above, and provide an adsorption refrigerator that achieves high cooling performance while suppressing the increase in the volume of the device as a whole.

Solution to Problem

In order to solve the problem described above, an adsorption refrigerator according to the present invention includes: an evaporator that generates cooling by vaporizing and gasifying a refrigerant under a reduced pressure; a first lower-layer adsorption reactor that contains an adsorbent that adsorbs the gasified refrigerant generated from the evaporator, and an adsorption heat exchanger that warms and cools the adsorbent in a time-division manner. Furthermore, the adsorption refrigerator includes a second lower-layer adsorption reactor that contains an adsorbent that adsorbs the gasified refrigerant generated from the evaporator, and an adsorption heat exchanger that warms and cools the adsorbent in a time-division manner. Moreover, the adsorption refrigerator includes an upper-layer adsorption reactor that contains an adsorbent that alternately receives and then adsorbs the gasified refrigerant generated from the first lower-layer adsorption reactor and the second lower-layer adsorption reactor, and an adsorption heat exchanger that warms and cools the adsorbent in a time-division manner; and a condenser that cools and condenses, under a reduced pressure, the gasified refrigerant generated from the upper-layer adsorption reactor, and that supplies the liquefied refrigerant to the evaporator. In addition, the adsorption refrigerator includes a plurality of open/close valves provided between the condenser and the first upper-layer adsorption reactor, between the first upper-layer adsorption reactor and the first lower-layer adsorption reactor, between the first upper-layer adsorption reactor and the second lower-layer adsorption reactor, between the first lower-layer adsorption reactor and the evaporator, and between the second lower-layer adsorption reactor and the evaporator. Furthermore, the adsorption refrigerator includes a first cooling/heating switching valve for heating and cooling the adsorbent in a time-division manner by using the adsorption heat exchanger of the first upper-layer adsorption reactor; and a second cooling/heating switching valve for heating and cooling the adsorbent in a time-division manner by using the adsorption heat exchanger of each of the first lower-layer adsorption reactor and the second lower-layer adsorption reactor. A control portion controls opening and closing states of the plurality of open/close valves, and the first cooling/heating switching valve and the second cooling/heating switching valve, and performs sequence control of: at a first point in time, cooling one of the first lower-layer adsorption reactor and the second lower-layer adsorption reactor, heating the other one, and cooling the first upper-layer adsorption reactor; and at a second point in time, heating and then cooling the one of the first lower-layer adsorption reactor and the second lower-layer adsorption reactor while continuing a state of cooling the other one.

Advantageous Effects of Invention

According to the present invention, it is possible to provide the adsorption refrigerator that achieves high cooling performance while suppressing the increase in the volume of the device as a whole.

Problems, configurations, and effects other than those described above are made clear by the following descriptions of embodiments.

BRIEF DESCRIPTION OF DRAWINGS

FIG. 5 is a time chart concerning an adsorption refrigerator.

FIG. 6 is a schematic view illustrating an operation state of an adsorption refrigerator.

FIG. 7 is a schematic view illustrating an operation state of an adsorption refrigerator.

FIG. 10 is a time chart concerning an adsorption refrigerator.

FIG. 11 is a schematic view illustrating an adsorption refrigerator including two-staged adsorption reactors according to prior art.

DESCRIPTION OF EMBODIMENTS

First Embodiment

Overall Configuration

Figure 1:
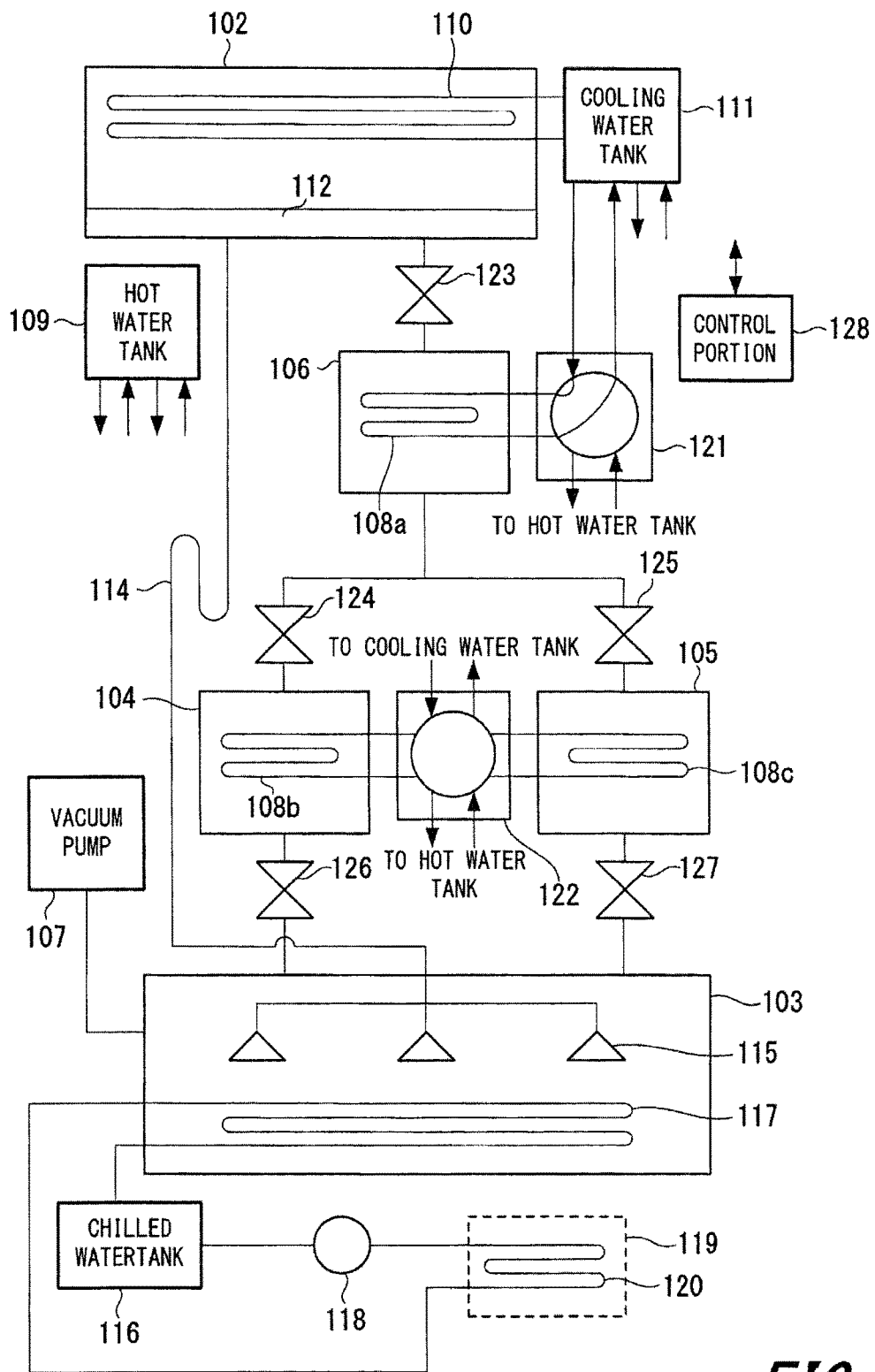
FIG. 1 is a diagram illustrating an overall configuration of an adsorption refrigerator according to a first embodiment of the present invention.

FIG. 1 is a diagram illustrating an overall configuration of an adsorption refrigerator according to a first embodiment of the present invention.

As illustrated in FIG. 1, an adsorption refrigerator 101 includes a condenser 102 provided in the uppermost portion thereof, and an evaporator 103 provided in the lowermost portion thereof. In addition, three adsorption reactors are provided between the condenser 102 and the evaporator 103.

A first lower-layer adsorption reactor 104 and a second lower-layer adsorption reactor 105 are arranged side by side above the evaporator 103. In addition, an upper-layer adsorption reactor 106 is provided above the first lower-layer adsorption reactor 104 and the second lower-layer adsorption reactor 105 and below the condenser 102.

Furthermore, the adsorption refrigerator 101 includes a vacuum pump 107 that evacuates air from the condenser 102, the evaporator 103, the first lower-layer adsorption reactor 104, the second lower-layer adsorption reactor 105, and the upper-layer adsorption reactor 106. The vacuum pump 107 reduces pressure of the condenser 102, the evaporator 103, the first lower-layer adsorption reactor 104, the second lower-layer adsorption reactor 105, and the upper-layer adsorption reactor 106 to be approximately 10 hpa (1/100 atmospheric pressure).

The upper-layer adsorption reactor 106 contains adsorbent not illustrated, and an adsorption heat exchanger 108a.

Similarly, the first lower-layer adsorption reactor 104 also contains adsorbent not illustrated, and an adsorption heat exchanger 108b. The second lower-layer adsorption reactor 105 also contains adsorbent not illustrated, and an adsorption heat exchanger 108c.

Furthermore, the adsorption refrigerator 101 includes a hot water tank 109 that supplies hot water circulating through the adsorption heat exchangers 108a, 108b, and 108c provided within the upper-layer adsorption reactor 106, the first lower-layer adsorption reactor 104, and the second lower-layer adsorption reactor 105. In addition, the adsorption refrigerator 101 includes a cooling water tank 111 that supplies cooling water circulating through the adsorption heat exchangers 108a, 108b, and 108c, and a cooling water radiator 110 provided to the condenser 102.

In the condenser 102, the refrigerant vapor flowing from the upper-layer adsorption reactor 106 is condensed by the cooling water radiator 110 in a state where the inside of the condenser 102 is under the reduced pressure. The condensed refrigerant 112 is accumulated at the bottom of the condenser 102, and is supplied through a refrigerant pipe 114 to the evaporator 103.

One end of the refrigerant pipe 114s is connected with the bottom of the condenser 102. The other end of the refrigerant pipe 114 is connected with a refrigerant dropping unit 115 provided within the evaporator 103. A first chilled water radiator 117 through which chilled water from a chilled water tank 116 circulates is provided below the refrigerant dropping unit 115.

In the evaporator 103, the refrigerant 112 flowing from the refrigerant pipe 114 is dropped onto the first chilled water radiator 117 with the refrigerant dropping unit 115 in a state where the inside of the evaporator 103 is under the reduced pressure. Then, the boiling point of a liquid decreases under the reduced pressure, and thus the refrigerant 112 takes away heat from the first chilled water radiator 117, and vaporizes. The refrigerant vapor generated as a result of vaporization of the refrigerant 112 is guided alternately to the first lower-layer adsorption reactor 104 and the second lower-layer adsorption reactor 105, via an open/close valve which will be described later.

The first chilled water radiator 117 is connected with one end of a chilled water pump 118 via the chilled water tank 116. The other end of the chilled water pump 118 is connected with a second chilled water radiator 120 provided within a cooling target 119. Chilled water cooled through the first chilled water radiator 117 is supplied from the chilled water tank 116 via the chilled water pump 118 to the second chilled water radiator 120, and thus the cooling target 119 is cooled.

The cooling water tank 111 is filled with cooling water of approximately 30° C., and supplies, with a pump (not illustrated), the cooling water that circulates through the adsorption heat exchangers 108a, 108b, and 108c of the upper-layer adsorption reactor 106, the first lower-layer adsorption reactor 104 and the second lower-layer adsorption reactor 105, and the cooling water radiator 110 provided to the condenser 102. Furthermore, the hot water tank 109 is filled with hot water of 50° C. or higher, and supplies, with a pump (not illustrated), the hot water that circulates through the adsorption heat exchangers 108a, 108b, and 108c provided within the upper-layer adsorption reactor 106, the first lower-layer adsorption reactor 104, and the second lower-layer adsorption reactor 105.

The first lower-layer adsorption reactor 104 and the second lower-layer adsorption reactor 105 are provided with an unillustrated adsorbent within a container having the same size, and the adsorption heat exchangers 108b and 108c each entirely containing the adsorbent. The adsorbent includes, for example, known silica gel, zeolite, activated carbon, or the like. The adsorbent adsorbs the refrigerant vapor when cooled, and desorbs the adsorbed refrigerant vapor when heated.

The adsorption heat exchangers 108b and 108c include pipes made of metal such as copper or aluminum and having provided a large number of fins that facilitate heat exchange. These fins each have a general, known shape. The adsorbent is laid out in the spaces between fins of each of the adsorption heat exchangers 108b and 108c or on the surface of fins. By constituting the adsorption reactors such that a large number of the adsorption heat exchangers 108b and 108c as described above are layered within the container of each of the adsorption reactors, it is possible to facilitate adsorption and desorption of the refrigerant vapor by using the adsorbent.

The upper-layer adsorption reactor 106 is provided with an unillustrated adsorbent within its container, and the adsorption heat exchanger 108a entirely containing the adsorbent. Namely, the upper-layer adsorption reactor 106 is constituted having the same structure as the shape of each of the first lower-layer adsorption reactor 104 and the second lower-layer adsorption reactor 105.

The adsorption heat exchanger 108a of the upper-layer adsorption reactor 106 is connected with a first cooling/heating switching valve 121. The first cooling/heating switching valve 121 is further connected with the cooling water tank 111 and the hot water tank 109. FIG. 2 shows an example of the structure of the first cooling/heating switching valve 121.

Figure 2A:
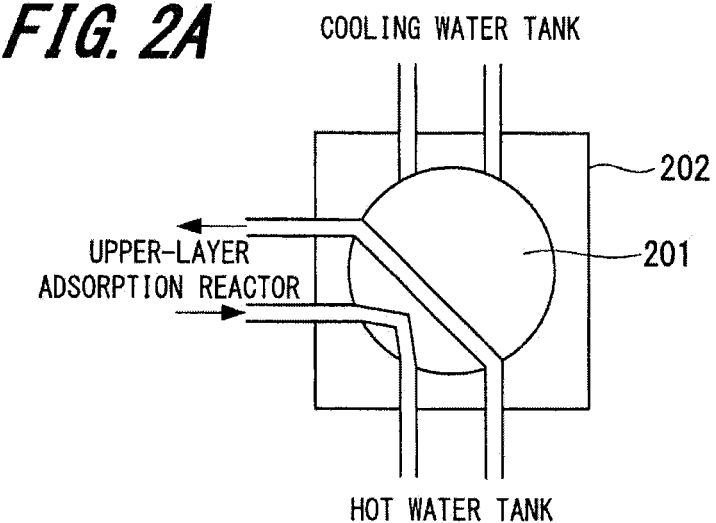
FIG. 2 is a schematic view illustrating a first cooling/heating switching valve.
Figure 2B:
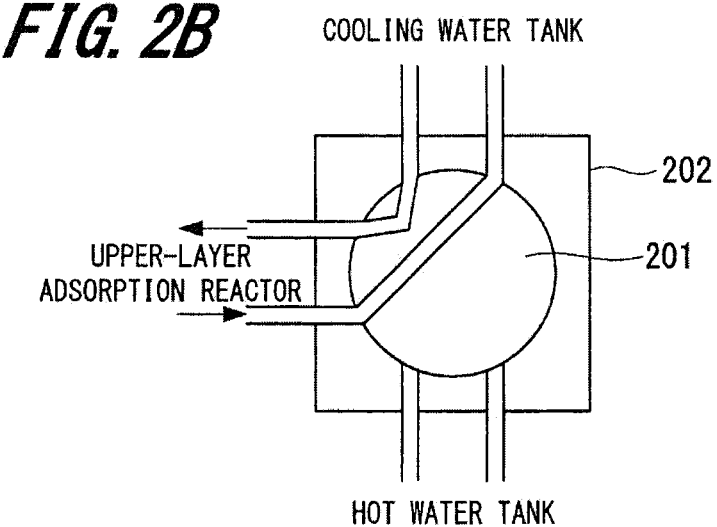

FIG. 2A and FIG. 2B are schematic views each illustrating the first cooling/heating switching valve 121.

When a movable portion 201 of the first cooling/heating switching valve 121 is in a state illustrated in FIG. 2A, the adsorption heat exchanger 108a of the upper-layer adsorption reactor 106 is connected with the hot water tank 109, and thus hot water is circulated through the adsorption heat exchanger 108a.

The movable portion 201 of the first cooling/heating switching valve 121 is in a state illustrated in FIG. 2B through rotation of the movable portion 201 by 90° in the right direction on the paper surface from the state illustrated in FIG. 2A. In this state illustrated in FIG. 2B, the adsorption heat exchanger 108a of the upper-layer adsorption reactor 106 is connected with the cooling water tank 111, and thus cooling water is circulated through the adsorption heat exchanger 108a.

Figure 3A:
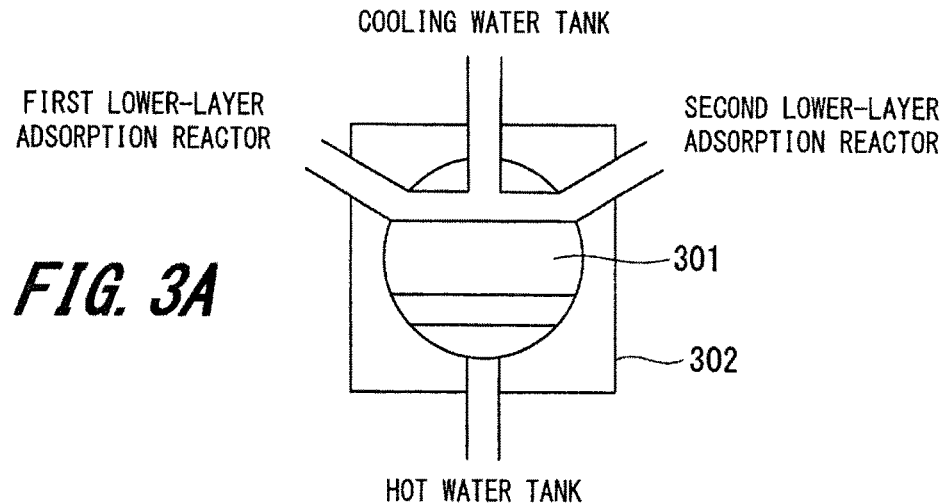
FIG. 3 is a schematic view illustrating a second cooling/heating switching valve.
Figure 3B:
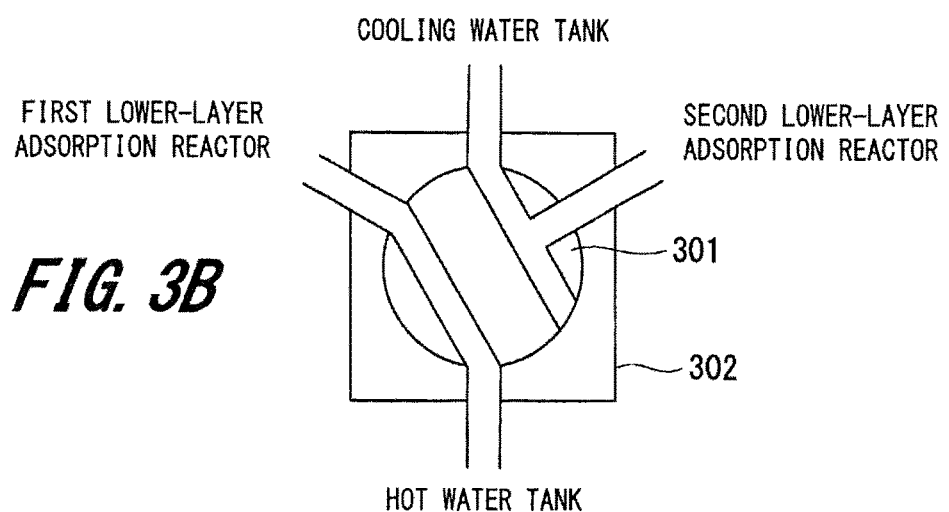
Figure 3C:
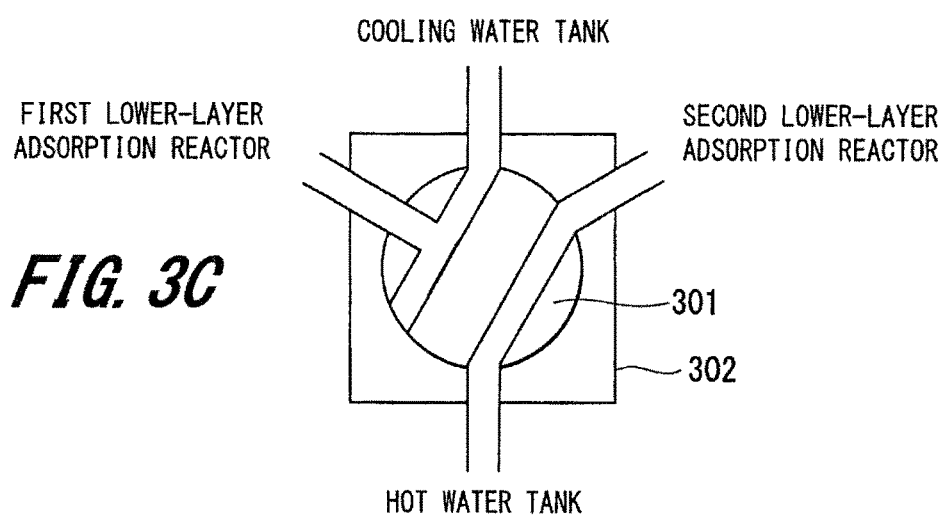

In contrast, as illustrated in FIG. 1, the first lower-layer adsorption reactor 104 and the second lower-layer adsorption reactor 105 are connected with a second cooling/heating switching valve 122. The second cooling/heating switching valve 122 is connected with the cooling water tank 111 and the hot water tank 109. FIG. 3A, FIG. 3B, and FIG. 3C show an example of the structure of the second cooling/heating switching valve 122.

FIG. 3A, FIG. 3B, and FIG. 3C are schematic views each illustrating the second cooling/heating switching valve 122.

In the second cooling/heating switching valve 122, water circuits constituted of a movable portion 301 and a fixed portion 302 illustrated in FIG. 3A are formed in a form of double-loading in a direction perpendicular to the paper surface of FIG. 3. One water circuit of the double-loaded water circuits is a water circuit for supplying cooling water or hot water, and the other water circuit is a water circuit for collecting cooling water or hot water.

When the movable portion 301 of the second cooling/heating switching valve 122 is in a state illustrated in FIG. 3A, both of the adsorption heat exchanger 108b of the first lower-layer adsorption reactor 104 and the adsorption heat exchanger 108c of the second lower-layer adsorption reactor 105 are connected with the cooling water tank 111. Therefore, cooling water circulates through both of the adsorption heat exchanger 108b and the adsorption heat exchanger 108c. In contrast, supply of hot water from the hot water tank 109 is blocked, and thus hot water does not circulate anywhere.

The second cooling/heating switching valve 122 is in a state illustrated in FIG. 3B through rotation of the movable portion 301 of the first cooling/heating switching valve 121 by 60° in the right direction on the paper surface from the state illustrated in FIG. 3A.

When the second cooling/heating switching valve 122 is in this state illustrated in FIG. 3B, the adsorption heat exchanger 108c of the second lower-layer adsorption reactor 105 is connected with the cooling water tank 111. Therefore, cooling water circulates through the adsorption heat exchanger 108c. In addition, the hot water tank 109 is connected with the adsorption heat exchanger 108b of the first lower-layer adsorption reactor 104, and thus hot water circulates through the adsorption heat exchanger 108b.

The second cooling/heating switching valve 122 is in a state illustrated in FIG. 3C through rotation of the movable portion 301 of the first cooling/heating switching valve 121 by 60° in the left direction on the paper surface from the state illustrated in FIG. 3A.

When the second cooling/heating switching valve 122 is in this state illustrated in FIG. 3C, the adsorption heat exchanger 108b of the first lower-layer adsorption reactor 104 is connected with the cooling water tank 111. Therefore, cooling water is circulated through the adsorption heat exchanger 108b. In addition, the adsorption heat exchanger 108c of the second lower-layer adsorption reactor 105 is connected with the hot water tank 109, and thus hot water is circulated through the adsorption heat exchanger 108c.

Again, referring to FIG. 1, the adsorption refrigerator 101 will be further described.

As illustrated in FIG. 1, a first open/close valve 123 is provided between the condenser 102 and the upper-layer adsorption reactor 106. Furthermore, a second open/close valve 124 is provided between the upper-layer adsorption reactor 106 and the first lower-layer adsorption reactor 104. Moreover, a third open/close valve 125 is provided between the upper-layer adsorption reactor 106 and the second lower-layer adsorption reactor 105.

In addition, a fourth open/close valve 126 is provided between the first lower-layer adsorption reactor 104 and the evaporator 103. A fifth open/close valve 127 is provided between the second lower-layer adsorption reactor 105 and the evaporator 103. The first open/close valve 123, the second open/close valve 124, the third open/close valve 125, the fourth open/close valve 126, and the fifth open/close valve 127 are appropriately open-close controlled by a control portion 128 together with the first cooling/heating switching valve 121 and the second cooling/heating switching valve 122, whereby chilled water warmed by the cooling target 119 is cooled again.

Figure 4:
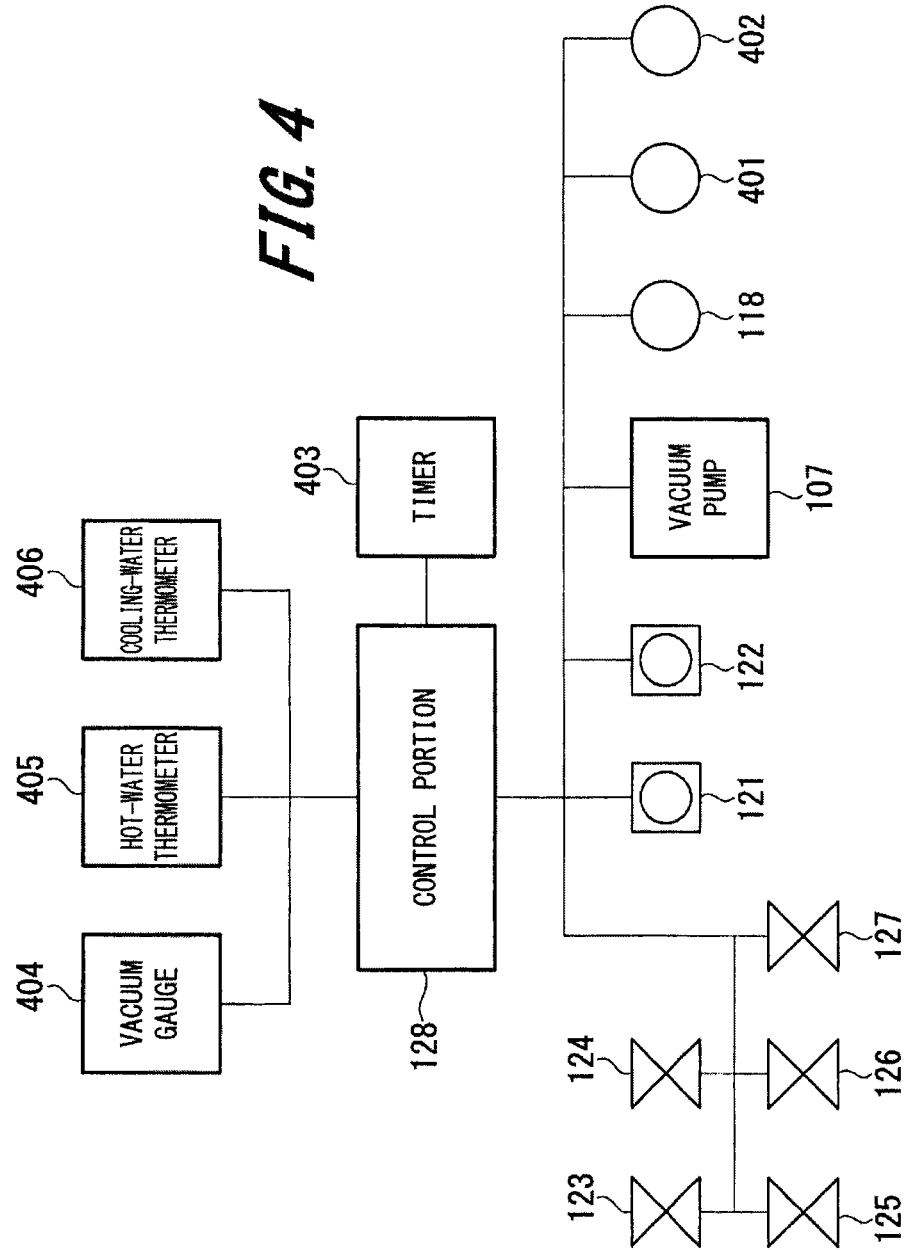
FIG. 4 is a functional block diagram illustrating an adsorption refrigerator.

FIG. 4 is a functional block diagram illustrating the adsorption refrigerator 101.

The control portion 128 controls, through known sequence control, the first open/close valve 123, the second open/close valve 124, the third open/close valve 125, the fourth open/close valve 126, the fifth open/close valve 127, the first cooling/heating switching valve 121, the second cooling/heating switching valve 122, the vacuum pump 107, the chilled water pump 118, a hot water pump 401 for the hot water tank 109, and a cooling water pump 402 for the cooling water tank 111. The control portion 128 constituted of a known microcomputer acquires information from a vacuum gauge 404 provided within the evaporator 103, a hot-water thermometer 405 provided within the hot water tank 109, and a cooling-water thermometer 406 provided within the cooling water tank 111, on the basis of timing information received from a timer 403 to thereby determine whether or not the adsorption refrigerator 101 can operate, and appropriately adjusts sequential timings.

For example, in the case where the reduced pressure created by the vacuum pump 107 is inadequate, the refrigerant 112 does not rapidly vaporize within the evaporator 103. Therefore, it is important to check whether or not the air pressure in the evaporator 103 or the like reaches the appropriate reduced pressure. For this reason, the vacuum gauge 404 is provided.

Furthermore, the temperature of hot water in the hot water tank 109 affects significantly the rate at which desorption reaction progresses during each of desorption processes in the first lower-layer adsorption reactor 104, the second lower-layer adsorption reactor 105, and the upper-layer adsorption reactor 106. The higher the temperature of the hot water is, in the shorter time the refrigerant vapor can be desorbed from the adsorbent. However, in the case where temperature of the hot water is high, heat excessively remains in the adsorbent if the adsorbent is unnecessarily heated, and thus the adsorbent cannot be sufficiently cooled even if the adsorbent is cooled with the cooling water. Therefore, in the case where temperature of the hot water is high, it is necessary to reduce the period of time for the desorption process.

As described above, the control portion 128 determines on the basis of the information obtained from the vacuum gauge 404 whether or not the adsorption refrigerator 101 can operate, and appropriately adjust sequential timings on the basis of the information obtained from the hot-water thermometer 405 and the cooling-water thermometer 406.

As can be seen from the description above, the adsorption refrigerator 101 according to the first embodiment is constituted having two-layered (two-staged) adsorption reactors. However, as to the adsorption reactor provided at the upper stage, only one adsorption reactor, which is the upper-layer adsorption reactor 106, is necessary, and thus the number of the adsorption reactors can be reduced by one as compared with the adsorption refrigerator (see FIG. 11) according to the prior art. As described above, one large-sized part can be reduced, and thus it is possible to reduce the size of and the cost of the adsorption refrigerator as compared with the prior art.

First Embodiment

Operations

Below, the operation flow of the adsorption refrigerator 101 according to the first embodiment of the present invention will be described with reference to FIG. 5, FIG. 6A, FIG. 6B, FIG. 6C, FIG. 6D, FIG. 7E, FIG. 7F, FIG. 7G, and FIG. 7H.

FIG. 5 is a time chart concerning the adsorption refrigerator 101. FIG. 6A, FIG. 6B, FIG. 6C, FIG. 6D, FIG. 7E, FIG. 7F, FIG. 7G, and FIG. 7H are schematic views each illustrating an operation state of the adsorption refrigerator 101.

In FIG. 5, (a) shows a time chart concerning the fourth open/close valve 126.

In FIG. 5, (b) shows a time chart concerning the first lower-layer adsorption reactor 104.

In FIG. 5, (c) shows a time chart concerning the second open/close valve 124.

In FIG. 5, (d) shows a time chart concerning the fifth open/close valve 127.

In FIG. 5, (e) shows a time chart concerning the second lower-layer adsorption reactor 105.

In FIG. 5, (f) shows a time chart concerning the third open/close valve 125.

In FIG. 5, (g) shows a time chart concerning the upper-layer adsorption reactor 106.

In FIG. 5, (h) shows a time chart concerning the first open/close valve 123.

In FIG. 5, the term "open" represents a state where the open/close valve is opened, and the term "close" represents a state where the open/close valve is closed.

In FIG. 6A, FIG. 6B, FIG. 6C, FIG. 6D, FIG. 7E, FIG. 7F, FIG. 7G, and FIG. 7H, the valves painted out in black of the first open/close valve 123, the second open/close valve 124, the third open/close valve 125, the fourth open/close valve 126, and the fifth open/close valve 127 indicate that the valve is closed, and the outlined valves indicate that the valve is opened.

In FIG. 5, FIG. 6A, FIG. 6B, FIG. 6C, FIG. 6D, FIG. 7E, FIG. 7F, FIG. 7G, and FIG. 7H, the "adsorption" represents a state where the cooling water passes through in order to cause the specified adsorption reactor of the first lower-layer adsorption reactor 104, the second lower-layer adsorption reactor 105, and the upper-layer adsorption reactor 106 to adsorb the refrigerant vapor. Namely, an adsorption process is indicated in which the open/close valve located on the lower side is opened; the open/close valve located on the upper side is closed; and an adsorption reactor concerned absorbs the refrigerant vapor from a unit located directly below the adsorption reactor.

In FIG. 5, FIG. 6A, FIG. 6B, FIG. 6C, FIG. 6D, FIG. 7E, FIG. 7F, FIG. 7G, and FIG. 7H, the "desorption" represents a state where the hot water passes through in order to cause the specified adsorption reactor of the first lower-layer adsorption reactor 104, the second lower-layer adsorption reactor 105, and the upper-layer adsorption reactor 106 to desorb the refrigerant vapor. That is, a desorption process is indicated in which the open/close valve located on the lower side is closed; the open/close valve on the upper side is opened; and an adsorption reactor concerned discharges the refrigerant vapor to a unit located thereabove.

Furthermore, in FIG. 5, FIG. 6A, FIG. 6B, FIG. 6C, FIG. 6D, FIG. 7E, FIG. 7F, FIG. 7G, and FIG. 7H, the "precooling" represents a state where the cooling water passes through the specified adsorption reactor of the first lower-layer adsorption reactor 104, the second lower-layer adsorption reactor 105, and the upper-layer adsorption reactor 106 to prepare for the adsorption process. Namely, a precooling process is indicated in which both the open/close valve located on the lower side and the open/close valve located on the upper side are closed, and an adsorption reactor concern is cooled in preparation for the next adsorption process.

In FIG. 5, FIG. 6A, FIG. 6B, FIG. 6C, FIG. 6D, FIG. 7E, FIG. 7F, FIG. 7G, and FIG. 7H, the "preheating" represents a state where the hot water passes through the specified adsorption reactor of the first lower-layer adsorption reactor 104, the second lower-layer adsorption reactor 105, and the upper-layer adsorption reactor 106 to prepare for the desorption process. That is, a preheating process is indicated in which both the open/close valve located on the lower side and the open/close valve located on the upper side are closed, and an adsorption reactor concerned is heated in preparation the next desorption process.

At a time t1 illustrated in FIG. 5, all of the first open/close valve 123, the second open/close valve 124, the third open/close valve 125, and the fourth open/close valve 126 are closed, and only the fifth open/close valve 127 is opened as illustrated in FIG. 6A. In this state, the first lower-layer adsorption reactor 104 has the hot water supplied thereto, and thus, is in the preheating process. Furthermore, the second lower-layer adsorption reactor 105 has the cooling water supplied thereto, and thus, is in the adsorption process. The upper-layer adsorption reactor 106 has the cooling water supplied thereto, and thus, is in the precooling process.

Namely, at the time t1, the refrigerant vapor only moves from the evaporator 103 to the second lower-layer adsorption reactor 105.

At a time t2 illustrated in FIG. 5, the first open/close valve 123, the third open/close valve 125, and the fourth open/close valve 126 are closed, and the second open/close valve 124 and the fifth open/close valve 127 are opened as illustrated in FIG. 6B. In this state, the first lower-layer adsorption reactor 104 has the hot water supplied thereto, and thus, is in the desorption process. The second lower-layer adsorption reactor 105 has the cooling water supplied thereto, and thus, is in the adsorption process. The upper-layer adsorption reactor 106 has the cooling water supplied thereto, and thus, is in the adsorption process.

That is, at the time t2, the refrigerant vapor moves from the evaporator 103 to the second lower-layer adsorption reactor 105, and further, moves from the first lower-layer adsorption reactor 104 to the upper-layer adsorption reactor 106.

At a time t3 illustrated in FIG. 5, all of the first open/close valve 123, the second open/close valve 124, the third open/close valve 125, and the fourth open/close valve 126 are closed, and only the fifth open/close valve 127 is opened as illustrated in FIG. 6C. In this state, the first lower-layer adsorption reactor 104 has the cooling water supplied thereto, and thus, is in the precooling process. The second lower-layer adsorption reactor 105 has the cooling water supplied thereto, and thus, is in the adsorption process. The upper-layer adsorption reactor 106 has the hot water supplied thereto, and thus, is in the preheating process.

Namely, at the time t3, the refrigerant vapor only moves from the evaporator 103 to the second lower-layer adsorption reactor 105.

At a time t4 illustrated in FIG. 5, the first open/close valve 123, the fourth open/close valve 126, and the fifth open/close valve 127 are opened as illustrated in FIG. 6D. In addition, the second open/close valve 124 and the third open/close valve 125 are closed. In this state, the first lower-layer adsorption reactor 104 has the cooling water supplied thereto, and thus, is in the adsorption process. The second lower-layer adsorption reactor 105 has the cooling water supplied thereto, and thus, is in the adsorption process. The upper-layer adsorption reactor 106 has the hot water supplied thereto, and thus, is in the desorption process.

That is, at the time t4, the refrigerant vapor moves from the evaporator 103 to the first lower-layer adsorption reactor 104 and the second lower-layer adsorption reactor 105, and further, moves from the upper-layer adsorption reactor 106 to the condenser 102.

At a time t5 illustrated in FIG. 5, the first open/close valve 123, the second open/close valve 124, the third open/close valve 125, and the fifth open/close valve 127 are closed as illustrated in FIG. 7E. Only the fourth open/close valve 126 is opened. In this state, the first lower-layer adsorption reactor 104 has the cooling water supplied thereto, and thus, is in the adsorption process. The second lower-layer adsorption reactor 105 has the hot water supplied thereto, and thus, is in the preheating process. The upper-layer adsorption reactor 106 has the cooling water supplied thereto, and thus, is in the precooling process.

Namely, at the time t5, the refrigerant vapor only moves from the evaporator 103 to the first lower-layer adsorption reactor 104.

At a time t6 illustrated in FIG. 5, the first open/close valve 123, the second open/close valve 124, and the fifth open/close valve 127 are closed as illustrated in FIG. 7F. In addition, the third open/close valve 125 and the fourth open/close valve 126 are opened. In this state, the first lower-layer adsorption reactor 104 has the cooling water supplied thereto, and thus, is in the adsorption process. The second lower-layer adsorption reactor 105 has the hot water supplied thereto, and thus, is in the desorption process. The upper-layer adsorption reactor 106 has the cooling water supplied thereto, and thus, is in the adsorption process.

That is, at the time t6, the refrigerant vapor moves from the evaporator 103 to the first lower-layer adsorption reactor 104, and further, moves from the second lower-layer adsorption reactor 105 to the upper-layer adsorption reactor 106.

At a time t7 illustrated in FIG. 5, the first open/close valve 123, the second open/close valve 124, the third open/close valve 125, and the fifth open/close valve 127 are closed as illustrated in FIG. 7G. In addition, only the fourth open/close valve 126 is opened. In this state, the first lower-layer adsorption reactor 104 has the cooling water supplied thereto, and thus, is in the adsorption process. The second lower-layer adsorption reactor 105 has the cooling water supplied thereto, and thus, is in the precooling process. The upper-layer adsorption reactor 106 has the hot water supplied thereto, and thus, is in the preheating process.

Namely, at the time t7, the refrigerant vapor only moves from the evaporator 103 to the first lower-layer adsorption reactor 104.

At a time t8 illustrated in FIG. 5, the first open/close valve 123, the fourth open/close valve 126, and the fifth open/close valve 127 are opened as illustrated in FIG. 7H. In addition, the second open/close valve 124 and the third open/close valve 125 are closed.

In this state, the first lower-layer adsorption reactor 104 has the cooling water supplied thereto, and thus, is in the adsorption process. The second lower-layer adsorption reactor 105 has the cooling water supplied thereto, and thus, is in the adsorption process. The upper-layer adsorption reactor 106 has the hot water supplied thereto, and thus, is in the desorption process.

Namely, at the time t8, the refrigerant vapor moves from the evaporator 103 to the first lower-layer adsorption reactor 104 and the second lower-layer adsorption reactor 105, and further, moves from the upper-layer adsorption reactor 106 to the condenser 102.

The feature of the sequence control performed by the adsorption refrigerator 101 as described above lies in that one of the first lower-layer adsorption reactor 104 and the second lower-layer adsorption reactor 105 keeps performing the adsorption process, while the other one changes processes of preheating, desorption, precooling, and adsorption. At this time, the upper-layer adsorption reactor 106 changes processes of precooling, adsorption, preheating, and desorption in synchronization with the sequence control performed by adsorption reactors located on the lower layer thereof.

Furthermore, in order to achieve the sequence control described above, the second cooling/heating switching valve 122 is required to be able to supply the cooling water to both of the first lower-layer adsorption reactor 104 and the second lower-layer adsorption reactor 105 at the same time. The time t4 and the time t8 illustrated in FIG. 5, that is, FIG. 6D and FIG. 7H correspond to a state where the cooling water is supplied to both of the first lower-layer adsorption reactor 104 and the second lower-layer adsorption reactor 105. For this reason, as illustrated in FIG. 3A, the second cooling/heating switching valve 122 employs a structure that can supply the cooling water to both of the first lower-layer adsorption reactor 104 and the second lower-layer adsorption reactor 105 at the same time, and block the circulation of the hot water.

[Simulation]

Results of simulation calculation concerning performance of the adsorption refrigerator 101 described above will be shown.

Figure 8:
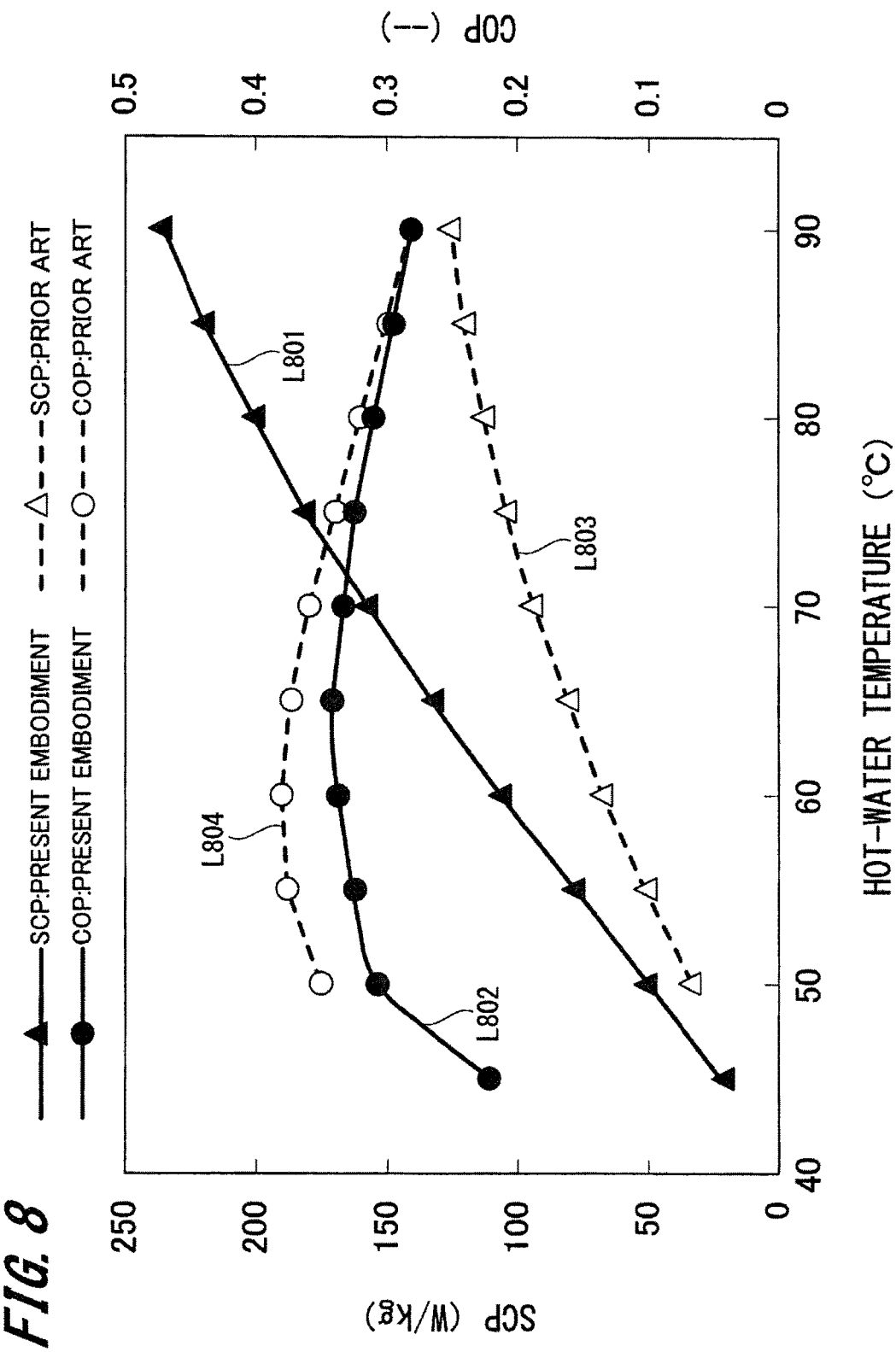
FIG. 8 is a graph in which performances are compared between a two-layered adsorption refrigerator according to prior art and an adsorption refrigerator according to the first embodiment of the present invention.

FIG. 8 is a graph in which performances are compared between the two-layered adsorption refrigerator 1101 according to the prior art and the adsorption refrigerator 101 according to the first embodiment of the present invention. The horizontal axis shows temperatures of hot water, and the vertical axis shows COP (Coefficient Of Performance) and refrigeration output SCP (Specific Cooling Power) of adsorbent relative to weight. In FIG. 8, the line L801 represents SCP of the present embodiment, and the line L802 represents COP of the present embodiment. In contrast, the line L803 represents SCP of the prior art, and the line L804 represents COP of the prior art.

In the case of the adsorption refrigerator 101 according to the first embodiment, COP slightly decreases as compared with the adsorption refrigerator 1101 according to the prior art. However, the refrigeration output SCP of adsorbent relative to weight significantly enhances. Namely, it can be found that the adsorption refrigerator 101 according to the present embodiment significantly enhances use efficiencies of adsorbent as compared with the prior art, whereas the COP is not significantly decreased as compared with the conventional type.

Second Embodiment

Overall Configuration

Figure 9:
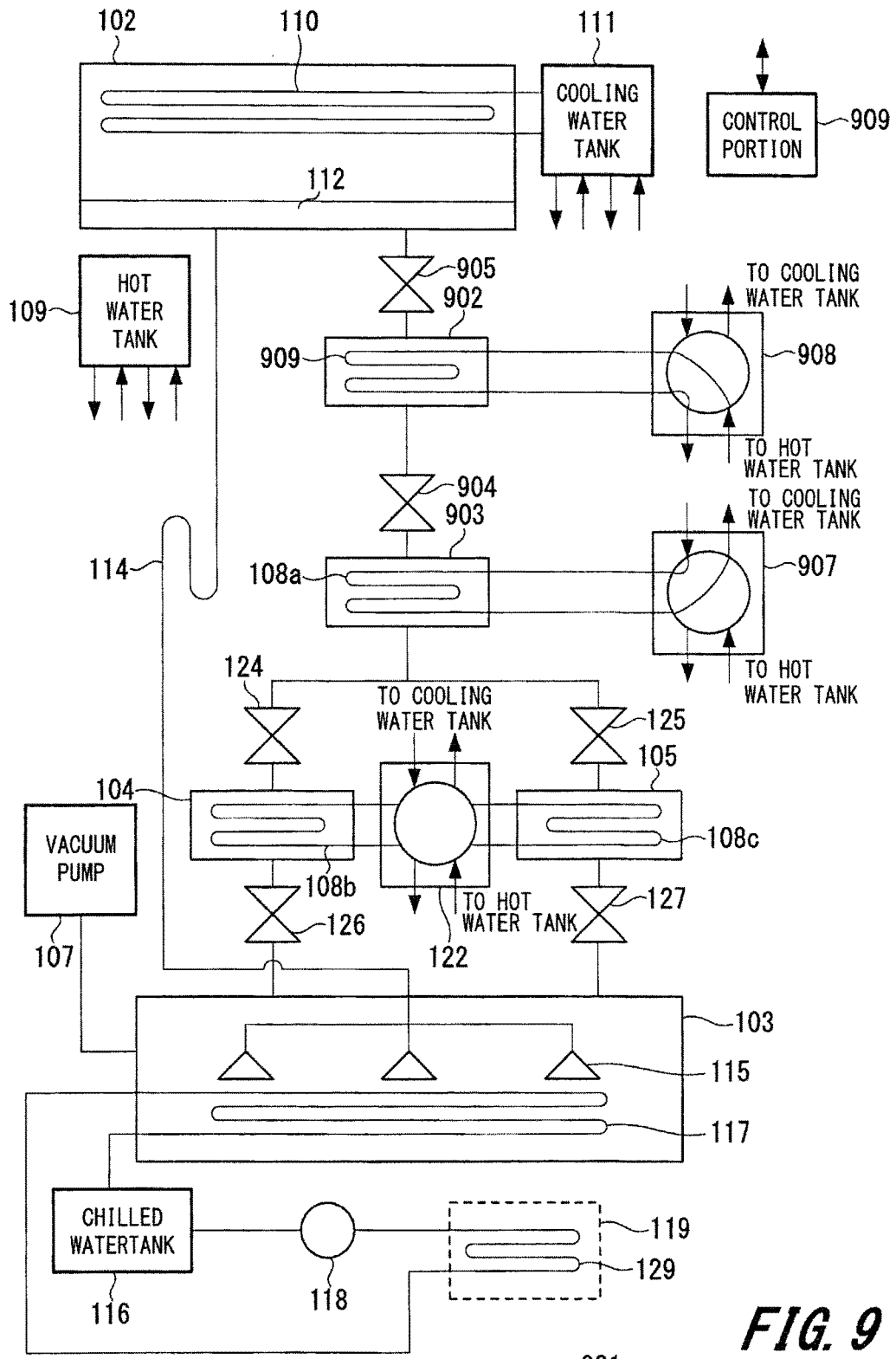
FIG. 9 is a configuration diagram illustrating an adsorption refrigerator according to a second embodiment of the present invention.

FIG. 9 is a configuration diagram illustrating an adsorption refrigerator 901 according to a second embodiment of the present invention.

In FIG. 9, the same reference signs are attached to things common to those in the adsorption refrigerator 101 according to the first embodiment illustrated in FIG. 1, and explanations thereof will not be repeated.

The adsorption refrigerator 901 illustrated in FIG. 9 differs from the adsorption refrigerator 101 according to the first embodiment illustrated in FIG. 1 in that an intermediate-layer adsorption reactor 903 is additionally provided below an upper-layer adsorption reactor 902. Namely, the adsorption refrigerator 101 according to the first embodiment has two layers of adsorption reactors, whereas the adsorption refrigerator 901 according to the second embodiment has three layers of adsorption reactors.

By constituting adsorption reactors into three layers as in the adsorption refrigerator 901, it becomes possible to maintain cooling performance even if temperatures of hot water for heating the adsorption reactors are lower than those in the adsorption refrigerator 101 having two layers of the adsorption reactors.

Second Embodiment

Operations

FIG. 10 is a time chart concerning the adsorption refrigerator 901.

In FIG. 10, (a) shows a time chart concerning the first lower-layer adsorption reactor 104.

In FIG. 10, (b) shows a time chart concerning the second lower-layer adsorption reactor 105.

In FIG. 10, (c) shows a time chart concerning the intermediate-layer adsorption reactor 903.

In FIG. 10, (d) shows a time chart concerning the first open/close valve 904.

In FIG. 10, (e) shows a time chart concerning the upper-layer adsorption reactor 902.

In FIG. 10, (f) shows a time chart concerning the sixth open/close valve 905.

In FIG. 10, the term "open" represents a state where the open/close valve is opened, and the term "close" represents a state where the open/close valve is closed.

In FIG. 10, the terms "adsorption," "desorption," "precooling," and "preheating" have the same meanings as those in FIG. 5, FIG. 6, and FIG. 7.

In the adsorption refrigerator 901 according to the second embodiment, portions provided on the lower side from the intermediate-layer adsorption reactor 903 operate in the same manner as those in the adsorption refrigerator 101 according to the first embodiment. The time chart concerning the first lower-layer adsorption reactor 104 illustrated in (a) of FIG. 10 is the same as the time chart concerning the first lower-layer adsorption reactor 104 illustrated in (b) of FIG. 5. The time chart concerning the second lower-layer adsorption reactor 105 illustrated in (b) of FIG. 10 is the same as the time chart concerning the second lower-layer adsorption reactor 105 illustrated in (e) of FIG. 5.

Therefore, in FIG. 10, the display of the time charts of the fourth open/close valve 126 illustrated in (a) of FIG. 5, the second open/close valve 124 illustrated in (c) of FIG. 5, the fifth open/close valve 127 illustrated in (d) of FIG. 5, and the third open/close valve 125 illustrated in (f) of FIG. 5 is omitted.

The time chart concerning the intermediate-layer adsorption reactor 903 illustrated in (c) of FIG. 10 is the same as the time chart concerning the upper-layer adsorption reactor 106 illustrated in (g) of FIG. 5. The time chart concerning the first open/close valve 904 illustrated in (d) of FIG. 10 is the same as the time chart concerning the first open/close valve 123 illustrated in (h) of FIG. 5.

The time chart concerning the upper-layer adsorption reactor 902 illustrated in (e) of FIG. 10 has an inverse relationship with the time chart concerning the upper-layer adsorption reactor 106 illustrated in (g) of FIG. 5. The time chart concerning the sixth open/close valve 905 illustrated in (f) of FIG. 10 has an opposite phase relationship with the time chart concerning the first open/close valve 123 illustrated in (h) of FIG. 5.

The adsorption refrigerator 901 according to the second embodiment has adsorption reactors formed into a three-layer type. In the case of the prior art, the provision of six adsorption reactors in total is required for the three-layer type, but in the case of the adsorption refrigerator 901 according the present embodiment, the number of adsorption reactors required is only four in total.

In the present embodiment, the following application examples are possible.

(1) It can be said in general for the adsorption refrigerator 101 as a whole, but the refrigerant does not necessarily have to be water. Similarly, hot water, cooling water, and chilled water do not necessarily have to be water. However, it is desirable that impurities are not contained in the refrigerant as much as possible since vaporization and condensation are repeated for the refrigerant.

(2) It is also possible to employ a configuration in which the first cooling/heating switching valve 121, the second cooling/heating switching valve 122, and the third cooling/heating switching valve 908 according to the second embodiment are combined with plural open/close valves.

(3) The evaporator 103, the adsorption reactors, and the condenser 102 in the adsorption refrigerator 101 do not necessarily have to be arranged in a vertical arrangement relationship as illustrated in FIG. 1 or FIG. 9.

In FIG. 1 and FIG. 9, since the evaporator 103 receives the condensed refrigerant from the condenser 102, the evaporator 103 is preferably arranged on a side lower than the condenser 102. However, the arrangement is not necessary if a pump is provided to the refrigerant pipe 114.

In FIG. 1, unlike the condenser 102 and the evaporator 103, the refrigerant vapor gasified from the refrigerant passes through the first lower-layer adsorption reactor 104, the second lower-layer adsorption reactor 105, and the upper-layer adsorption reactor 106, which are provided between the condenser 102 and the evaporator 103. Therefore, with a structure in which the refrigerant vapor can passes through without causing any trouble, it is possible to freely set the relative arrangement of the condenser 102 and the evaporator 103 with respect to the first lower-layer adsorption reactor 104, the second lower-layer adsorption reactor 105, and the upper-layer adsorption reactor 106. For example, as long as the evaporator 103 is disposed directly below the condenser 102, there may be disposed the first lower-layer adsorption reactor 104, the second lower-layer adsorption reactor 105, and the upper-layer adsorption reactor 106, above the condenser 102 or below the evaporator 103, and there is no limitation on the relative arrangement relationship in the vertical direction of the first lower-layer adsorption reactor 104, the second lower-layer adsorption reactor 105, and the upper-layer adsorption reactor 106.

The limitation concerning the arrangement relationship also applies to the upper-layer adsorption reactor 902, the intermediate-layer adsorption reactor 903, the first lower-layer adsorption reactor 104, and the second lower-layer adsorption reactor 105, in FIG. 9.

(4) The adsorption refrigerator 101 disclosed in the first embodiment and the adsorption refrigerator 901 disclosed in the second embodiment succeed in reducing the number of adsorption reactors by improving the operation sequence as compared with the prior art. As to the adsorption refrigerator 101 and the adsorption refrigerator 901, no limitation is applied on the filling amount of adsorbent filled in each adsorption reactor to be used, or material of the adsorbent. Hereinafter, the degree of freedom in designing adsorption reactors in the adsorption refrigerator 101 will be described with reference to the adsorption refrigerator 101 illustrated in FIG. 1.

First, in the case where adsorption capability of adsorbent is low, it becomes necessary to increase the filling amount of an adsorbent filled in each adsorption reactor in order to achieve a desired adsorption performance. Therefore, if the type of an adsorbent in the upper-layer adsorption reactor 106 connected with the condenser 102 is different from that in the first lower-layer adsorption reactor 104 and the second lower-layer adsorption reactor 105 connected with the evaporator 103, it is not necessary to set the filling amount to be equal to each other.

Next, in general, the adsorption capability of each adsorption reactor is expressed as a function of relative pressure.

The relative pressure of the first lower-layer adsorption reactor 104 and the second lower-layer adsorption reactor 105 connected with the evaporator 103 is determined by "pressure of refrigerant vapor an evaporation temperature when a refrigerant evaporates in the evaporator 103/saturated vapor pressure of the refrigerant at a temperature when an adsorbent in the first lower-layer adsorption reactor 104 and the second lower-layer adsorption reactor 105 is cooled with cooling water." Here, the evaporation temperature is a design parameter that depends on the atmospheric pressure in the evaporator 103.

On the other hand, the relative pressure of the upper-layer adsorption reactor 106 connected with the condenser 102 is determined by "adsorption equilibrium pressure at a temperature when an adsorbent is heated inside the first lower-layer adsorption reactor 104 and the second lower-layer adsorption reactor 105/saturated vapor pressure of a refrigerant at a temperature when an adsorbent in the upper-layer adsorption reactor 106 connected with the condenser 102 is cooled."

On the basis of the definition expressions described above, the relative pressure of the first lower-layer adsorption reactor 104 and the second lower-layer adsorption reactor 105 connected with the evaporator 103 is not necessarily the same as the relative pressure of the upper-layer adsorption reactor 106 connected with the condenser 102. Therefore, the performance of the adsorption refrigerator 101 as a whole may be possibly enhanced by combining adsorbents having different adsorption performances between the first lower-layer adsorption reactor 104/the second lower-layer adsorption reactor 105 and the upper-layer adsorption reactor 106. Alternatively, it may be considered that different types of adsorbents are mixed. In this case, it is also considered that the mixture ratio of adsorbents in the first lower-layer adsorption reactor 104 and the second lower-layer adsorption reactor 105 is varied from the mixture ratio of adsorbents in the upper-layer adsorption reactor 106.

Furthermore, because of the structure of the adsorption refrigerator 101, it is desirable that the first lower-layer adsorption reactor 104 and the second lower-layer adsorption reactor 105 have equal adsorption performance as much as possible. However, as has been described above, the adsorption performance of each adsorption reactor is a function of relative pressure. Namely, even if adsorbents having different adsorption performances are employed between the first lower-layer adsorption reactor 104 and the second lower-layer adsorption reactor 105, it is possible to achieve the equal adsorption performance by adjusting the filling amount of adsorbent filled in each of the first lower-layer adsorption reactor 104 and the second lower-layer adsorption reactor 105, or adjusting cycle time of heating and cooling.

In the present embodiment, the adsorption refrigerator 101 has been disclosed.

The adsorption refrigerator 101 according to the present embodiment has the configuration in which only one adsorption reactor is positioned directly above the first lower-layer adsorption reactor 104 and the second lower-layer adsorption reactor 105. In addition, the adsorption refrigerator 101 according to the present embodiment performs sequence control in which one of the first lower-layer adsorption reactor 104 and the second lower-layer adsorption reactor 105 keeps performing the adsorption process, whereas the other one changes processes of preheating, desorption, precooling, and adsorption. At this time, the upper-layer adsorption reactor 106 positioned directly above the first lower-layer adsorption reactor 104 and the second lower-layer adsorption reactor 105 changes processes of precooling, adsorption, preheating, and desorption in synchronization with the sequence control performed by adsorption reactors located on the lower layer thereof.

In order to achieve the sequence control as described above, the adsorption refrigerator 101 according to the present embodiment is provided with the second cooling/heating switching valve 122 that has a capability of supplying cooling water to both of the first lower-layer adsorption reactor 104 and the second lower-layer adsorption reactor 105 at the same time.

By employing the sequence control as described above, the adsorption refrigerator 101 according to the present embodiment can reduce the number of adsorption reactors by one without causing significant deterioration in cooling performance as compared with the prior art, and can reduce the volume the adsorption refrigerator 101 occupies.

Hereinabove, descriptions has been given of exemplary embodiments according to the present invention. However, the present invention is not limited to the exemplary embodiments described above, and includes other modification examples and application examples without departing from the gist of the present invention described in claims.

REFERENCE SIGNS LIST

101 . . . adsorption refrigerator, 102 . . . condenser, 103 . . . evaporator, 104 . . . first lower-layer adsorption reactor, 105 . . . second lower-layer adsorption reactor, 106 . . . upper-layer adsorption reactor, 107 . . . vacuum pump, 108a, 108b, 108c . . . adsorption heat exchanger, 109 . . . hot water tank, 110 . . . cooling water radiator, 11l . . . cooling water tank, 112 . . . refrigerant, 114 . . . refrigerant pipe, 115 . . . refrigerant dropping unit, 116 . . . chilled water tank, 117 . . . first chilled water radiator, 118 . . . chilled water pump, 119 . . . target of cooling, 120 . . . second chilled water radiator, 121 . . . first cooling/heating switching valve, 122 . . . second cooling/heating switching valve, 123 . . . first open/close valve, 124 . . . second open/close valve, 125 . . . third open/close valve, 126 . . . fourth open/close valve, 127 . . . fifth open/close valve, 128 . . . control portion, 201 . . . movable portion, 301 . . . movable portion, 302 . . . fixed portion, 401 . . . hot water pump, 402 . . . cooling water pump, 403 . . . timer, 404 . . . vacuum gauge, 405 . . . hot-water thermometer, 406 . . . cooling-water thermometer, 901 . . . adsorption refrigerator, 902 . . . upper-layer adsorption reactor, 903 . . . intermediate-layer adsorption reactor, 904 . . . first open/close valve, 905 . . . sixth open/close valve

The invention claimed is:

1. A adsorption refrigerator, comprising:
an evaporator that generates cooling by vaporizing and gasifying a refrigerant under a reduced pressure;
a first lower-layer adsorption reactor that contains
an adsorbent that adsorbs the gasified refrigerant generated from the evaporator, and
an adsorption heat exchanger that warms and cools the adsorbent in a time-division manner;
a second lower-layer adsorption reactor that contains
an adsorbent that adsorbs the gasified refrigerant generated from the evaporator, and
an adsorption heat exchanger that warms and cools the adsorbent in a time-division manner;
a first upper-layer adsorption reactor that contains
an adsorbent that alternately receives and then adsorbs the gasified refrigerant generated from the first lower-layer adsorption reactor and the second lower-layer adsorption reactor, and
an adsorption heat exchanger that warms and cools the adsorbent in a time-division manner;
a condenser that cools and condenses, under a reduced pressure, the gasified refrigerant generated from the first upper-layer adsorption reactor, and that supplies the liquefied refrigerant to the evaporator;
a plurality of open/close valves provided between the condenser and the first upper-layer adsorption reactor, between the first upper-layer adsorption reactor and the first lower-layer adsorption reactor, between the first upper-layer adsorption reactor and the second lower-layer adsorption reactor, between the first lower-layer adsorption reactor and the evaporator, and between the second lower-layer adsorption reactor and the evaporator;
a first cooling/heating switching valve for heating and cooling the adsorbent in a time-division manner by using the adsorption heat exchanger of the first upper-layer adsorption reactor;
a second cooling/heating switching valve for heating and cooling the adsorbent in a time-division manner by using the adsorption heat exchanger of each of the first lower-layer adsorption reactor and the second lower-layer adsorption reactor; and
a control portion that
controls opening and closing states of the plurality of open/close valves, and the first cooling/heating switching valve and the second cooling/heating switching valve, and
performs sequence control of: at a first point in time, cooling one of the first lower-layer adsorption reactor and the second lower-layer adsorption reactor, heating the other one, and cooling the first upper-layer adsorption reactor; and at a second point in time, heating and then cooling the one of the first lower-layer adsorption reactor and the second lower-layer adsorption reactor while continuing a state of cooling the other one.

2. The adsorption refrigerator according to claim 1, wherein
the control portion controls opening and closing states of the plurality of open/close valves, and controls the first cooling/heating switching valve and the second cooling/heating switching valve, so as to:
perform an adsorption process of cooling the second lower-layer adsorption reactor to adsorb the gasified refrigerant generated from the evaporator while performing an adsorption process of cooling the first lower-layer adsorption reactor to adsorb the gasified refrigerant generated from the evaporator;
then perform an desorption process of heating the second lower-layer adsorption reactor to desorb the refrigerant from the adsorbent; and
subsequently perform an adsorption process of cooling the second lower-layer adsorption reactor to adsorb the gasified refrigerant generated from the evaporator.

3. The adsorption refrigerator according to claim 2, further comprising:
a second upper-layer adsorption reactor that contains
an adsorbent that adsorbs the gasified refrigerant generated from the first upper-layer adsorption reactor, and
an adsorption heat exchanger that warms and cools the adsorbent in a time-division manner.

* * * * *